Jan. 6, 1970  A. A. AVALLONE  3,488,126
BATH SPONGE
Filed Feb. 10, 1969  2 Sheets-Sheet 1
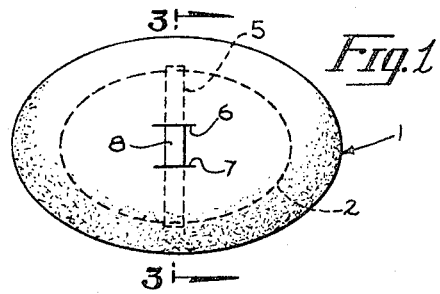
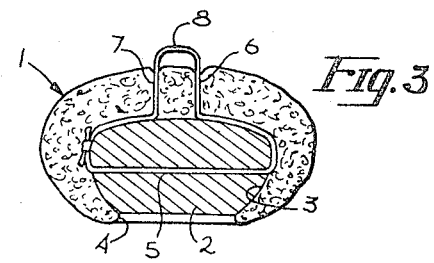
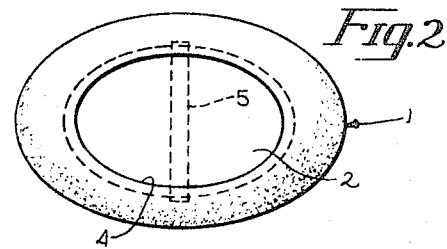
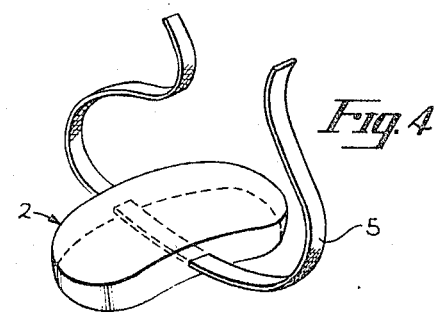
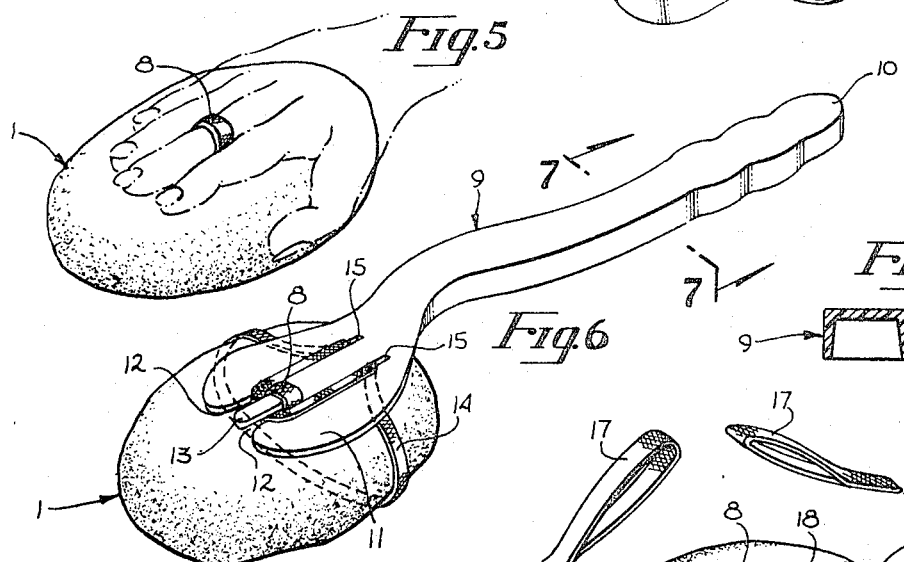
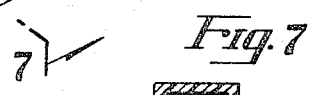
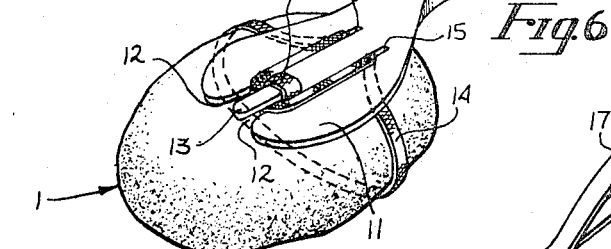
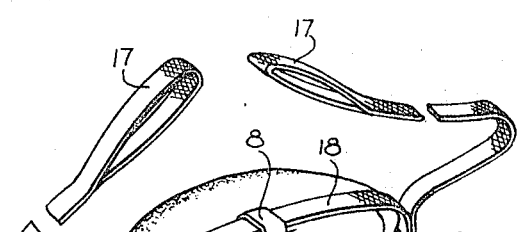
ARTHUR A AVALLONE
INVENTOR.

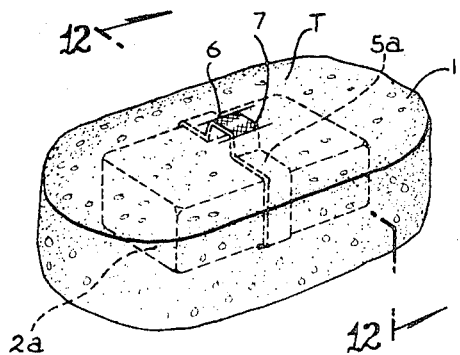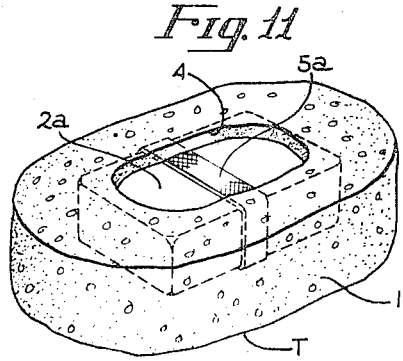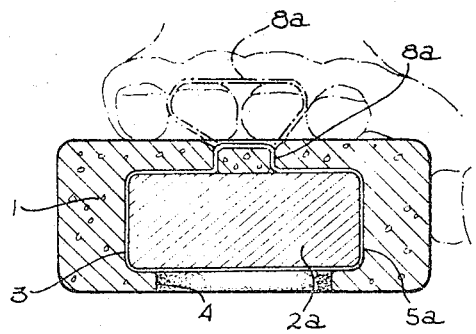

United States Patent Office 3,488,126
Patented Jan. 6, 1970

3,488,126
BATH SPONGE
Arthur A. Avallone, 1437 Highland Ave.,
Glendale, Calif. 91202
Continuation-in-part of application Ser. No. 763,700,
Sept. 30, 1968. This application Feb. 10, 1969, Ser.
No. 802,320
Int. Cl. A47k 7/03; A46b 5/04
U.S. Cl. 401—8    6 Claims

ABSTRACT OF THE DISCLOSURE

A combined sponge and soap cake for bathing purposes. The sponge is provided with a cavity in which the soap cake is received, one side of the soap cake being exposed. The soap cake is retained by resilient means in the sponge cavity and said resilient means extends to an outer surface of the sponge for remotely securing the combined sponge and soap cake on the hand of the user or on a manipulating means engageable by the hand or hands of the user.

---

This application is a continuation-in-part of my patent application Ser. No. 763,700, filed Sept. 30, 1968, and now abandoned.

BACKGROUND OF THE INVENTION

Field of the invention

The field of the invention is that of combined sponge and soap cake devices.

Prior art

The prior art known to applicant comprises the following patents:
1,577,861, Henry, Mar. 23, 1926; 2,035,014, Schaefer, Mar. 24, 1936; 2,588,773, Smith, Mar. 11, 1952; 2,635,273, Logan, Apr. 21, 1953; 3,099,032, Webb, July 30, 1963; 3,114,928, Spiteri, Dec. 24, 1963; 3,124,827, Hull, Mar. 17, 1964; 3,130,441, Hahn, Apr. 28, 1968.

SUMMARY OF THE INVENTION

The object of the invention is to provide a soap cake and sponge means which facilitates bathing procedures in that the combined sponge and soap cake are optionally attachable to the hand of the user, to a rigid handle affording use as a back brush, or to the midlength portion of an elongated flexible member of which the opposite ends may be hand held to cause the sponge and soap cake to be used as a back brush means. It is particularly useful for older persons for whom dropping of the soap while taking a shower bath presents a hazard or danger from slipping or falling or a hazard deriving from the danger of cerebral or heart accidents from the effort of bending over. It is anticipated that hospitals and convalescent homes will find the invention extremely useful in providing safer bathing and showering conditions.

BRIEF DESCRIPTION OF THE DRAWINGS

Preferred embodiments of the invention are depicted in the drawings which form a part of the specification following and in said drawings:

FIGURES 1 and 2 are, respectively, back and front elevations of the soap cake and sponge components as cooperatively assembled in one embodiment of the invention;

FIGURE 3 is a transverse medial section on the line 3—3 of FIGURE 1 rotated clockwise 90°;

FIGURE 4 is a perspective view of one embodiment of the soap cake component in which a hole is provided in the soap cake for engaging a holding strip;

FIGURE 5 is a perspective view showing a mode of attaching the combined sponge and soap cake components of FIGURE 1 to the hand of a user;

FIGURE 6 is a perspective view of a representative mode of attaching the combined sponge and soap cake components of FIGURE 1 to a handle;

FIGURE 7 is a sectional view taken on the line 7—7 of FIGURE 6;

FIGURE 8 is a bottom plan view of the distal end of the handle means shown in FIGURE 6, the soap cake and sponge being shown in phantom lines; and, FIGURE 9 is a perspective view showing a strap accessory attachable to the combined soap cake and sponge components, a portion of said components being broken away to illustrate a detail of construction of said accessory;

FIGURES 10 and 11 are, respectively, back and front elevations of another embodiment of the soap cake and sponge components as cooperatively assembled with the holding strip surrounding the outer surfaces of the soap cake;

FIGURE 12 is a transverse medial section on the line 12—12 of FIGURE 10 rotated clockwise 90° and showing in phantom lines a mode of attaching the combined sponge and soap cake components to the hand of the user;

FIGURE 13 is a perspective view of another representative mode of attaching the combined sponge and soap cake components to a handle.

DETAILED DESCRIPTION OF A PREFERRED EMBODIMENT

In one embodiment of the invention (FIGURES 1-4), there is shown a sponge component 1 and a soap cake component 2. The sponge component may be either a natural sponge or any synthetic (rubber or plastic equivalent thereof, said sponge component being of flattened ovoid configuration and having a cavity 3 in one side face thereof of a size to resiliently envelop the soap cake component 2 except where the greater portion of one side of the soap cake, the opening of the cavity being bordered by a rim portion 4 of the sponge component which overlies the peripheral edge of the soap cake. Except for the somewhat thinner peripheral edge, the walls of the sponge component surrounding the soap cake are of considerable thickness being not less than about ¾" in thickness.

The soap cake component 1 is of any usual soap cake configuration, e.g., although rectangular with rounded corners, and incident to the manufacture, it is provided with an elastic flexible member 5 which extends through about the central plane between the side surfaces of the soap cake and transversely of the length of the soap cake. Preferably, one end of the flexible member is longer than the other. In inserting the soap cake into the sponge component cavity, the longer end of the resilient member 5 is inserted through a slit 6 in the bottom of the cavity to the outer side surface of the sponge component and is then returned through a slit 7 spaced from and parallel to the slit 6 and is tied to the shorter end of the resilient member with sufficient tightness so that the soap cake is retained within the cavity, the knot and ends of the resilient strip being tucked into the cavity as shown in FIGURE 3.

The portion or bight 8 of the strip 5 which extends between the slits 6 and 7 on the outer face of the sponge components forms an elastic strap under which a finger of the hand of the user may be inserted with incident stretching of the bight and compression of the sponge whereby the combined sponge and soap cake can be held on the hand of the user by the same means which serves to secure the soap cake within the sponge cavity.

When, through use, a soap cake has been at least substantially expended, the resilient component 5 thereof is either untied or cut, the unexpended soap material removed, and a new soap cake is inserted in the manner above described.

The use of the strap or bight portion 8 of the soap cake retaining strap is not limited to the above-described attachment to the hand of the user. In FIGURES 6 and 8 there is shown a rigid handle 9 which may be a plastic molding including a manually graspable shank portion 10 and a flattened end 11 having slots 12, 12 defining a tongue 13 which is insertable under the bight 8. Additionally, the said flattened end portion is provided with an endless loop 14 of elastic material which extends through parallel spaced slits 15, 15 in said flattened end portion at a point adjacent the juncture of said end portion with the shank end. In use, this loop portion is extended around the end of the sponge and the portion of said loop at the opposite side of the handle is then drawn forward and inserted under the end of the tongue 13 as shown in FIGURES 6 and 8 to stretch the loop and assist in anchoring the combined sponge and soap cake against the handle. With this arrangement, the sponge and soap are converted into a self-soaping back brush, it being noted that the handle means here described is quickly attached and removed and that the resilience of the flexible member 5 and of the sponge serve in part to hold the sponge on the handle means.

The means connecting the sponge and soap cake components also serves, in part, as the means by which said combined components may be attached when an elongated strap element by which the components may be reciprocated across the back of the user is employed. For this purpose, an elongated strap 16 preferably of woven material is employed, said strap having loops 17, 17 at the opposite ends thereof for engagement by the hands of the user. A shorter strap 18 which is slightly longer than the length of the sponge component has one end thereof attached by a seam 19 to the strap 17 at a point slightly offset from the midlength of that strap, the other end of said shorter strap being provided with a loop element 20 disposed with the opening thereof parallel to the length of the strap, said loop element being of a size to receive the longer end of the strap 16 having reference to the point of attachment of the strap 18. In use, the said shorter strap 18 may be inserted under the portion 8 of the elastic member 5 and the longer end of the strap 16 is then extended across the face of the exposed soap cake and inserted through the loop 20 with resultant partial compression of the sponge component. Thus, the unit comprising combined sponge and soap cake components is attached in the midlength of the strap 16 and the user, holding the strap 16 by the loops 17, 17 may employ the combined components as a back brush.

Another embodiment of the present invention is illustrated in FIGURES 10–12 in which the flexible member is not inserted through the soap cake, as shown in FIGURES 3 and 4. Instead flexible member 5a is stretched over a portion of the outer surface of a standard soap cake 2a. The flexible member 5a encircles the soap cake 2a. In this embodiment the resilient flexible member 5a can be formed with a suitably sized endless loop and inserted into sponge cavity 3 and threaded through the slits 6 and 7. The flexible member 5a can be sized to provide tight engagement with the soap cake 2a, even after repeated use of the soap cake. A standard commercially available soap cake 2a is utilized in this embodiment since the flexible member 5a is not part of the soap cake 2a and therefore no special manufacturing steps are required in making the soap cake.

FIGURE 12 illustrates how the flexible member 5a contacts and completely surrounds a portion of the outer surface of the soap cake 2a. The phantom lines indicate how the bight 8a of the strip 5a can be stretched to engage the fingers of the user.

FIGURE 13 illustrates another rigid handle means for attaching the combined sponge and soap components for use as a back brush in which the flattened end 11a has notches 21 and 22 which operate to hold the bight 8a fixed after the bight is stretched to engage the notches. Another endless loop 14a of elastic material extends through slits 15a, 15a in the flattened portion 11a to anchor the combined sponge and soap cake against the handle in a manner similar to that described above in FIGURES 6 and 8. Also, use of a strap such as shown in FIGURE 9 can also be utilized.

It should be understood that if desired the fingers of the user or the flattened porion 11a of the handle 9a may be inserted in the flexible portion 5a which is accessible through the opening of the cavity 3 and the rim portion 4. When this scheme is used for attaching the combined sponge and soap cake components the exposed surface of the soap cake will not contact the body of the user. Instead the sponge portion T which is on the side opposite the cavity portion 3 and rim portion 4 contacts the user's skin. This arrangement can be easily understood by referring to FIGURE 11 in which a portion of the flexible member 5a securing the soap cake across the opening in the sponge 1 is clearly shown. The bight 8 then serves to securely hold the soap cake 2a to the sponge 1.

By utilizing the invented structure a simple but highly effective sponge-soap assembly is achieved whereby the sponge and soap are securely attached to the hand or other handle means thereby eliminating the slipping problems now encountered in bathing and showering.

The invented structure is particularly suited for use by the handicapped or elderly who find it difficult to retreive a dropped sponge and/or soap cake.

In the foregoing specification the terms "sponge" or "sponge component" will be understood to include both natural sponges and any equivalent material formed from rubber, plastic or equivalent fibrous material.

While certain preferred embodiments have been illustrated and discussed herein other modifications within the spirit of the invention will be come apparent to those skilled in the art and therefore the invention is only to be limited by the scope of the appended claims.

I claim:
1. A bathing accessory comprising:
    (a) a soap cake of a given size;
    (b) a sponge, said sponge having therein a cavity in which is disposed said soap cake, said cavity being sized to receive and substantially envelop said soap cake said cavity extending to a first exterior surface of said sponge, and said cavity being bordered by a rim which is a part of said first sponge surface, said rim overlying the peripheral edge of said soap cake adjacent said rim allowing the soap component to be tightly retained in said sponge cavity, whereby one surface of said soap cake is substantially exposed through said first exterior surface of said sponge;
    (c) a pair of spaced parallel slits centrally positioned on said sponge and extending from the lower surface of said cavity to a second exterior surface of said sponge, said second sponge surface being substantially parallel to said first sponge surface; and,
    (d) a resilient member formed in the shape of an endless loop extending through said slits to form bight portion, said bight portion serving as a resilient means for optionally securing said accessory to a hand of a user or to a holding means to be held by the hand of a user, and resilient member having a remaining portion thereof engaging said soap cake to aid in retaining said soap cake in said cavity.
2. The bathing accessory claimed in claim 1 in which said sponge has walls which surround said cavity of not less than about ¾ inches thickness except for said rim which is substantially thinner.
3. A bathig accessory as claimed in claim 1 in which said resilient member is an elastic strap permanently at- tached to said soap cake, said strap extending transversely through said soap cake.

4. A bathing accessory as claimed in claim 1 in which said resilient means is an elastic strap of a given size which tightly engages and completely surrounds a portion of the outer surface of said soap cake which is immediately adjacent to said strap, whereby the soap cake is assembled into said accessory by stretching the elastic strap, inserting said soap into said stretched resilient means and then releasing said elastic strap.

5. A bathing accessory as claimed in claim 4 including a detachable handle means secured, at least in part, to said combined soap cake and sponge by said resilient member portion engaging said soap cake.

6. A bathing accessory as claimed in claim 1 including an elongated flexible strap means with holding loops at the ends thereof, said flexible strap being detachably mounted on said accessory by engaging said flexible strap through said bight portion and securing said flexible strap to said accessory and allowing both hands of the user to be inserted through said holding loops for manipulting said accessory across the back of the user.

References Cited

UNITED STATES PATENTS

| | | | |
|---|---|---|---|
| 1,787,660 | 1/1931 | Blakely | 401—8 |
| 2,191,642 | 2/1940 | Carvalho | 401—201 |
| 2,243,634 | 5/1941 | Kadish | 401—8 |
| 2,697,847 | 12/1954 | Levinson et al. | 401—201 X |
| 3,130,441 | 4/1964 | Hahn | 401—201 |

FOREIGN PATENTS 955,713   4/1964   Great Britain.

LAWRENCE CHARLES, Primary Examiner

U.S. Cl. X.R.

401—201